Dec. 24, 1946.  J. R. BOLDT ET AL  2,413,164
CAFETERIA CART
Filed Nov. 23, 1942
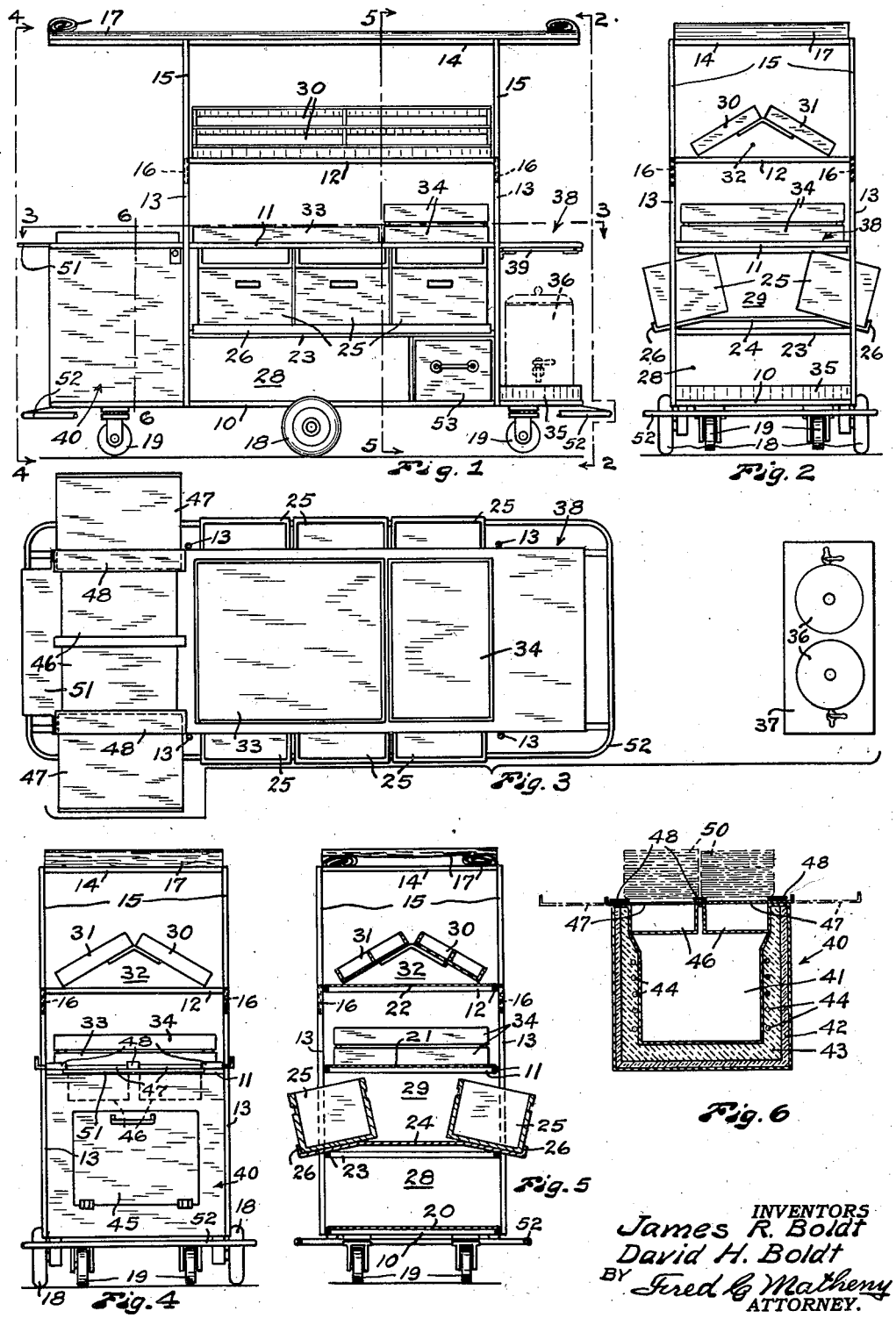
INVENTORS
James R. Boldt
David H. Boldt
BY Fred C. Matheny
ATTORNEY.

Patented Dec. 24, 1946

2,413,164

UNITED STATES PATENT OFFICE 2,413,164

CAFETERIA CART

James R. Boldt and David H. Boldt,
Seattle, Wash.

Application November 23, 1942, Serial No. 466,700

2 Claims. (Cl. 296—22)

This invention relates to cafeteria carts and an object of this invention is to improve carts of this type and render the same more efficient and more satisfactory in use.

Cafeteria carts of this type are used in the serving of food where the food must be brought to the customers and provision made for serving large numbers of customers in the shortest possible time.

One use for these cafeteria carts is in the serving of food in large industrial establishments where large numbers of persons are employed and where the food must be served out of doors or in the shops or yards where the people who are being served are employed.

It is an object of this invention to provide a cafeteria cart constructed so that food may be dispensed from both sides of the cart to two lines of customers moving past the cart thus making it possible to dispense the food faster than it can be dispensed to a single line of customers. This also provides for shorter lines of customers, a thing which has proven to be more satisfactory and pleasing to the customers that are being served.

Another object is to provide a cafeteria cart in which ample provision is made for keeping the foods in the very best possible condition for serving, especially as respects the cleanliness of the foods and the temperature of hot foods.

Another object is to provide a cafeteria cart which reduces the labor of serving the foods to a minimum and which makes it possible for two attendants at the cart to serve two lines of customers.

Another object is to provide a cafeteria cart of this nature in which provision is made for supplying at the cart, to the customers who wish hot drinks, the necessary cups for such hot drinks and then letting these customers fill their own cups with the hot drink after they have paid for their food and as they are leaving the cart.

Another object of the invention is to provide a cafeteria cart in which all of the food is kept in a sanitary condition and in which suitable cover means and drop curtain means are provided for affording all possible protection to the food on the cart.

Another object is to provide a cafeteria cart having an efficient electric warming oven which may be heated up at a location where electric current is available and which will retain and give off sufficient heat to keep the food warm for a long period of time after it is disconnected from the source of supply of electric current.

Another object is to provide, in connection with the upper portion of the warming oven, efficient means for keeping pans of food hot while said food is being dished out to customers, and to further provide covers for the pans, which covers are slidable in suitable guide means on the cart and are adapted to serve as supports for stacks of serving trays when the said covers are withdrawn so as to uncover the food pans.

Other objects of the invention will be apparent from the following description taken in connection with the accompanying drawing.

In the drawing Figure 1 is a side elevation of a cafeteria cart constructed in accordance with this invention; Fig. 2 is an end elevation of the same looking in the direction of broken line 2—2 of Fig. 1; Fig. 3 is a plan view, with parts in section, taken substantially on broken line 3—3 of Fig. 1 and showing a table with coffee urns thereon positioned in the location relative to this cart in which said table is used when food is being served from the cart; Fig. 4 is an end elevation looking in the direction of broken line 4—4 of Fig. 1; Fig. 5 is a sectional view taken on broken line 5—5 of Fig. 1, and Fig. 6 is a sectional view taken on broken line 6—6 of Fig. 1, and showing in broken lines two stacks of food serving trays supported on a warming oven.

Referring to the drawing, 10 designates a base frame, 11 a main table frame and 12 a tray-supporting frame for trays of food.

Preferably the frames 10, 11 and 12 are all of rectangular shape and are supported in spaced apart parallel relation, one above another, by upright side bars 13. The side bars 13 are set inwardly a substantial distance from the respective ends of the frames 10 and 11 so that the frames 10 and 11 project beyond the side bars 13. Preferably the frame 12 does not project beyond the side bars 13.

A top or cover member 14 is preferably provided above the upper frame 12. It is preferred to make this top or cover member readily removable from the cart so that said top or cover may be used or left off at will depending on the conditions under which the cart is being used. This may be done by providing on the top member 14, four downwardly extending supports 15 having their lower end portions telescopically connected by means 16 with the upper end portions of the upright side bars 13.

Preferably any desired number of drop curtains 17 are secured to the edge portions of the top member 14 and may be lowered alongside of the cart or folded or rolled and supported in an out of the way position on the top member 14. Obviously one or more of the curtains 17 may be lowered, as desired.

One preferred way of making the rectangular frames 10, 11 and 12 is to form them of metal tubing or pipe welded at the corners. The upright members 13 preferably are welded to the frame members 10, 11 and 12 and support said frame members in spaced apart parallel relation. The frames 10 and 11 extend to the right and to the left beyond the upright frame members 13, as shown. The frame 12 preferably terminates flush with the upright frame members 13 to avoid obstructing the space on the frame member 11 at the end portions of the cart.

The cart is preferably mounted for movement on a pair of larger wheels 18, positioned medially of the length of the cart and at the sides of the frames 10, and on two pairs of smaller wheels 19 positioned adjacent opposite ends of the cart and below the lower frame 10. Preferably the smaller wheels 19 have caster mountings to facilitate easy steering of the device. Also preferably the larger medial wheels 18 project slightly below a plane tangent to the bottoms of the smaller wheels 19 so that the medial wheels will carry the major portion of the load and steering of the cart will be made easier.

Each frame 10, 11 and 12 carries a deck or platform, preferably of sheet metal, which may be welded to its respective frame. These platforms are shown in Fig. 2 and are numbered 20, 21 and 22.

An intermediate frame 23, having a decking or platform 24, is provided between the base frame 10 and the table frame 11. The side portions of the decking 24 extend sidewise beyond the line of the upright frame members 13 and are inclined downwardly as shown in Figs. 2 and 5 and form supports for supporting boxes or cases 25 in an inclined position to render them readily accessible. The cases 25 are adapted to contain bottled or packaged goods. For instance one case 25 on each side of the cart may contain bottles of milk, another case may contain bottles of soft drink and the third case may contain packages of ice cream. Dry Ice may be used to keep the frozen foods from melting or becoming too soft. The edges 26 of the inclined portions of the decking 24 are bent upwardly to prevent displacement of the cases 25.

A storage space 28 is provided above the bottom decking 20 and below the intermediate decking 24 and another storage space 29 is provided above the intermediate decking 24 and below the table decking 21. The storage space 28 is accessible from the sides of the cart and the storage space 29 is accessible either from the end of the cart shown at the right in Fig. 1, or from either side of the cart by removal of one or more of the cases 25.

Preferably one or more drawers 53, that pull out from the sides of the cart, are provided between the bottom deck 20 and the intermediate deck 24.

Two sets of trays 30 and 31 are preferably provided on the upper deck 22 for the reception of candy bars and like articles of food. The two sets of trays 30 and 31 are inclined, as shown, toward opposite sides of the cart to better display the food articles thereon. The arrangement of the trays 30 and 31 leaves a space 32, open at the ends, between the deck 22 and the bottoms of said trys 30 and 31 in which small articles, such as knives and forks and spoons, may be stored.

The portion of the table deck 21 between the upright frame members 13 is preferably used for supporting sandwich trays 33 and cut pie stands or trays 34. If desired, several of the sandwich trays 33 or pie trays 34 may be loaded with food and stacked one on top of another. Two pie trays 34 are shown as positioned one on the other in the drawings. When the upper tray is emptied it is removed to make the food in the lower tray accessible.

The food trays 30, 31, 33 and 34 and the cases 25 are all readily accessible from both sides of the cart. The cases 25 protrude sidewise far enough and are inclined enough so that good visibility into these cases is insured.

Preferably the end portion of the base frame 10 and deck 20 that project to the right of the upright frame members 13, as respects the showing in Fig. 1, have shallow upright side members 35 secured thereto and this deck portion is adapted to have either one or two coffee urns 36 placed thereon when the cart is being moved from one location to another. One coffee urn 36 is shown by dot and dash lines in Fig. 1 and two of said urns are shown in plan in Fig. 3.

When the cart is stationary and food is being served therefrom the coffee urns 36 are removed from the cart and placed on a table 37 that is positioned a short distance from the right hand end of the cart, as shown in Fig. 3.

The portion 38 of the table frame 11 and deck 21 that extends to the right of the upright frame members 13, as respects the showing in Fig. 1, is adapted to be used as a combined cashier's shelf and table for coffee cups and like articles. Preferably one or more pull out shelves 39 are provided in connection with this cashier's shelf 38.

Preferably the cashier stands between the shelf 38 and the table 37 on which the coffee urns 36 are placed to receive the money from the customers and to dispense coffee cups, cream and sugar to those who wish coffee. Preferably the customers draw their own coffee from the urns 36 after paying for their food and coffee cups and as they are leaving the cart.

An electric warming oven, designated generally by 40, is provided between the base frame 10 and the table frame 11 at the left hand end of the cart as respects the showing in Fig. 1. The top of this electric oven forms a heated shelf from which hot food may be served, as hereinafter explained.

The electric warming oven 40 comprises an oven receptacle 41, Fig. 6, having relatively thick bottom and side walls each preferably formed of an outer layer 42 of heat insulating material and an inner layer 43 of material which will absorb a large amount of heat and give such heat off slowly to the oven receptacle. Electric heating elements 44 are provided for warming the oven receptacle 41 and walls 43. A door 45, Fig. 4, is provided for the oven 41 and this door is preferably lined with heat insulating and heat storage material similar to the walls 42—43 shown in Fig. 6.

The table top above the oven 41 is provided with one or more receptacles 46, as shown in Fig. 6, for the reception of one or more pans that contain food to be served. The receptacles 46 may be of any desired number and shape, depending on the number and shape of the pans to be used in serving. We have shown two of these receptacles 46 each of which may contain a pan of hot food, such as beef stew in one and mashed potatoes in the other.

Preferably there is very little or no insulation between the bottom walls of the receptacles 46 and the oven receptacle 41 so that food in pans or containers in the receptacles 46 will be kept warm by heat from the oven receptacle 41.

The oven receptacle 41 and lining 43 therefor are thoroughly heated by energizing the heating elements 44 for a substantial period of time before the cart is taken to the location where the food is to be served. It has been found that, after being thus thoroughly heated, the oven will give off enough heat to maintain the foods at a proper temperature for a period of two and one half hours. Food in suitable pans may be stored in the oven receptacle 41 and these pans may be removed and placed in the receptacles 46 as the serving proceeds.

The end portion of the cart at which the oven 40 is placed constitutes the head end of said cart and the lines of customers approach the cart from this end.

Sliding cover plates 47, preferably of sheet metal, are provided for the two receptacles 46. These cover plates 47 are slidably held by means such as plates 48, and are adapted to be withdrawn sidewise into the positions shown by full lines in Fig. 3 and by dot and dash lines in Fig. 6, to uncover the receptacles 46. Stacks of food serving trays 50 are usually placed on the plates 48 when the cart is being made ready for use and after the cart has been moved to the location where the food is to be served the cover plates 47 are pulled out and the stacks of trays are moved over onto these cover plates leaving the tops of the receptacles 46 open for the serving of food therefrom. The trays 50 are kept warm while supported above the receptacles 46 and will remain warm for a substantial period of time after being placed on the extended cover plates 47.

Preferably a carving plate 51 is provided on the end of the cart adjacent the receptacles 46 and flush with the deck 21. Also a guard rail 52 is preferably provided around the lower portion of the cart.

In the use of this cafeteria cart the food is prepared for serving and is loaded onto the cart in a kitchen where it is prepared. The cart is then wheeled to the location where the food is to be served, the small table 37 that normally supports the coffee urns 36 is placed far enough from the cashier's shelf 38 to afford room for the cashier to work, the coffee urns 36 are lifted off of the lower shelf of the cart and placed on the table 37, the curtains 17, if they have been in a lowered position, are raised and the food in the receptacles 46 is uncovered.

One attendant stands at the end of the cart near the oven 41 to dish up food from the pans in the receptacles 46 and another attendant stands at the other end of the cart adjacent the cashier's shelf 38 to receive payment for the food and to see that persons who wish a hot drink, as coffee, obtain cups.

The customers or persons desiring to obtain food from the cart form in two lines and move along the two opposite sides of the cart from left to right, as respects the showing in Figs. 1 and 3. As they pass the first attendant each customer may obtain a tray and a serving of hot food if he desires. He may then help himself to such food and drink as he wishes out of the trays 30, 31, 33, 34 and boxes 25. If he wishes a hot drink, such as coffee he will obtain a cup and cream and sugar from the cashier at the time he pays for his food and, as he leaves the cart will draw his own hot drink. This method of serving the hot drinks has been found to speed up the serving of foods from the cart and has made it possible to operate the cart efficiently and at maximum speed, as respects the serving of food, by the use of two attendants at the cart.

The foregoing description and accompanying drawing clearly disclose a preferred embodiment of this invention but it will be understood that this disclosure is merely illustrative and that changes in the invention may be made within the scope and spirit of the following claims.

We claim:

1. In a cafeteria cart, portable frame means; a food storage compartment carried by said frame means; depressed receptacles for food pans extending into the top portion of said food storage compartment; slidable covers for said receptacles; and guide means supporting said covers for movement into open and closed position relative to said receptacles, said guide means forming food tray supports above said receptacles and said covers forming food tray supports at the sides of said receptacles when said covers are in open position.

2. In a cafeteria cart, a lower platform; wheels supporting said lower platform; rigid side frame members extending upwardly from said lower platform at points inwardly from the ends thereof so that the end portions of said lower platform extend beyond said side frame members; a table platform substantially the same size and shape as said lower platform supported by said side frame members in spaced relation above said lower platform and in alignment with and parallel to said lower platform; a warming oven disposed between the portions of said lower platform and said table platform that project beyond said side frame members; an intermediate platform of shorter length than said lower platform and said table platform supported therebetween, the edge portions of said intermediate platform being inclined relative to the horizontal to impart an outward tilt to open topped receptacles supported thereon; an upper platform of shorter length than said table platform supported by said side frame members in spaced relation above said table platform; and two rows of open topped outwardly inclined food display trays extending longitudinally of said upper platform.

JAMES R. BOLDT.
DAVID H. BOLDT.